United States Patent
Yoshinaga

(10) Patent No.: US 9,263,165 B2
(45) Date of Patent: Feb. 16, 2016

(54) ELECTRICAL WIRE AND ELECTRICAL WIRE WITH TERMINAL

(75) Inventor: Satoru Yoshinaga, Susono (JP)

(73) Assignee: Yazaki Corporation, Tokyo (JP)

(*) Notice: Subject to any disclaimer, the term of this patent is extended or adjusted under 35 U.S.C. 154(b) by 252 days.

(21) Appl. No.: 13/806,546

(22) PCT Filed: Jul. 21, 2011

(86) PCT No.: PCT/JP2011/067182
§ 371 (c)(1),
(2), (4) Date: Dec. 21, 2012

(87) PCT Pub. No.: WO2012/011611
PCT Pub. Date: Jan. 26, 2012

(65) Prior Publication Data
US 2013/0092437 A1    Apr. 18, 2013

(30) Foreign Application Priority Data

Jul. 21, 2010   (JP) ................. 2010-163614

(51) Int. Cl.
| | | |
|---|---|---|
| *H01B 5/08* | (2006.01) | |
| *H01B 5/00* | (2006.01) | |
| *H01B 7/00* | (2006.01) | |
| *H01B 1/02* | (2006.01) | |
| *C22C 9/00* | (2006.01) | |

(Continued)

(52) U.S. Cl.
CPC .. *H01B 1/02* (2013.01); *C22C 9/00* (2013.01); *C22C 9/06* (2013.01); *C22F 1/00* (2013.01); *C22F 1/08* (2013.01); *H01B 1/026* (2013.01); *H02G 5/02* (2013.01)

(58) Field of Classification Search
CPC ........................................ H01B 1/02
USPC .......... 174/75 R, 102 A, 113 R, 126.1, 126.2, 174/128.1, 84 C
See application file for complete search history.

(56) References Cited

U.S. PATENT DOCUMENTS 5,149,917 A * 9/1992 Sawada et al. ............ 174/129 R
5,170,015 A * 12/1992 Kudo et al. ................. 174/128.1

(Continued)

FOREIGN PATENT DOCUMENTS

| CN | 101262091 A | 9/2008 |
|---|---|---|
| CN | 101326593 A | 12/2008 |

(Continued)

OTHER PUBLICATIONS

Office Action, dated Apr. 3, 2014, issued by the State Intellectual Property Office of the People's Republic of China in counterpart Chinese Application No. 201180035742.2.

(Continued)

*Primary Examiner* — Sherman Ng
(74) *Attorney, Agent, or Firm* — Sughrue Mion, PLLC

(57) ABSTRACT

The invention relates to an electrical wire and an electrical wire with a terminal capable of diminishing the adjustment of a crimping height. There is provided an electrical wire 1 including a conductor part 11 that is made of a precipitation strengthened copper alloy having a cross-sectional area of 0.13 sq in the ISO 6722 standard and is compressed, wherein the conductor part 11 has a rate of elongation of 7% or more, and a tensile strength of 500 MPa or more. In addition, the electrical conductivity of the conductor part is 70% IACS or more.

6 Claims, 6 Drawing Sheets

(51) Int. Cl.
    *C22C 9/06*      (2006.01)
    *C22F 1/00*      (2006.01)
    *C22F 1/08*      (2006.01)
    *H02G 5/02*      (2006.01)

(56) References Cited

U.S. PATENT DOCUMENTS

| | | | | |
|---|---|---|---|---|
| 5,486,653 | A * | 1/1996 | Dohi | 174/84 C |
| 6,900,391 | B1 * | 5/2005 | Maeda | 174/128.1 |
| 2004/0231883 | A1 * | 11/2004 | Kondo et al. | 174/128.1 |
| 2006/0011378 | A1 * | 1/2006 | Maeda | 174/128.1 |
| 2008/0172874 | A1 | 7/2008 | Yagi et al. | |
| 2008/0314612 | A1 | 12/2008 | Takahashi et al. | |
| 2009/0229715 | A1 | 9/2009 | Takahashi et al. | |
| 2009/0266575 | A1 * | 10/2009 | Yoshimoto et al. | 174/110 R |
| 2010/0294534 | A1 | 11/2010 | Mihara | |
| 2011/0045713 | A1 | 2/2011 | Ono et al. | |
| 2011/0100676 | A1 | 5/2011 | Oishi et al. | |
| 2012/0018192 | A1 | 1/2012 | Takahashi et al. | |

FOREIGN PATENT DOCUMENTS

| | | | |
|---|---|---|---|
| CN | 101535520 A | 9/2009 | |
| EP | 1973120 A1 | 9/2008 | |
| EP | 2060651 A1 | 5/2009 | |
| EP | 2385530 A1 | 11/2011 | |
| JP | 05302155 A | 11/1993 | |
| JP | 06025777 A | 2/1994 | |
| JP | 06089620 A | 3/1994 | |
| JP | 982375 A | 3/1997 | |
| JP | 200073153 A | 3/2000 | |
| JP | 2000073153 A | 3/2000 | |
| JP | 2007157509 A | 6/2007 | |
| JP | 200926695 A | 2/2009 | |
| JP | 2010-10013 A | 1/2010 | |
| JP | 2010212164 A | 9/2010 | |
| SU | 684657 A | 9/1979 | |
| WO | 2009016851 A1 | 2/2009 | |
| WO | 2009/057697 A1 | 5/2009 | |
| WO | 2009057697 A1 | 5/2009 | |
| WO | 2009107586 A1 | 9/2009 | |
| WO | 2009/154239 A1 | 12/2009 | |
| WO | 2009154239 A1 | 12/2009 | |
| WO | 2010084989 A1 | 7/2010 | |

OTHER PUBLICATIONS

Office Action, dated Apr. 23, 2014, issued by the Russian Patent Office in counterpart Russian Application No. 2013107509/07(011165).
Information Offer Form dated Jul. 15, 2014 issued by Japanese Patent Office in counterpart Japanese application No. 2010-163614.
Office Action issued Aug. 26, 2014, by the Japanese Patent Office in related Application No. 2010-163614.
International Search Report dated Feb. 2, 2012 from the International Searching Authority in counterpart application No. PCT/JP2011/067182.
Written Opinion dated Feb. 2, 2012 from the International Searching Authority in counterpart application No. PCT/JP2011/067182.
Office Action dated Dec. 9, 2014 issued by the Japanese Patent Office in counterpart Japanese Patent Application No. 2010-163614.
Communication issued on Dec. 15, 2014 by the State Intellectual Property Office of the PR of China in related application No. 201180035742.2.
Communication from the Japanese Patent Office dated Feb. 24, 2015 in a counterpart Japanese application No. 2010-163614.
Notice of Information Form dated Mar. 17, 2015 issued by the Japanese Patent Office in counterpart Japanese Patent Application No. 2010-163614.
Hirose Electric Co., Ltd.; "Manual Crimping Tool: Instruction Manual"; HRS; 2009; pp. 1-28.
Office Action dated May 19, 2015 issued by The State Intellectual Property Office Of The People's Republic Of China in counterpart Chinese Application No. 201180035742.2.
Chinese Office Action dated Dec. 4, 2015 issued in corresponding Chinese Patent Application No. 201180035742.2.

* cited by examiner

ELECTRICAL WIRE AND ELECTRICAL WIRE WITH TERMINAL

TECHNICAL FIELD

The present invention relates to an electrical wire and an electrical wire with a terminal.

BACKGROUND ART

In the background art, electrical wires having various conductor cross-sectional areas such as 0.13 sq, 0.3 sq, and 0.35 sq are known. In such electrical wires, as a conductor part, pure copper or an inexpensive copper alloy, or pure aluminum or an aluminum alloy is used in consideration of workability or price.

JP-A-9-82375, JP-A-2007-157509 and JP-A-2009-26695 disclose such electrical wires and connector parts.

SUMMARY OF INVENTION

Technical Problem

In a vehicle, large numbers of electrical wires are used. Therefore, the weight of the electrical wires has an effect on the weight of the vehicle, such that when considering weight-savings in the vehicle, weight-savings in the electrical wires is also to be considered. Particularly, an electrical wire of 0.3 sq or 0.35 sq is used as an electrical wire for the vehicle, and the substitution of the electrical wire with an electrical wire of 0.13 sq may lead to weight-savings in the vehicle. However, when an electrical wire of 0.13 sq is used, the following problems occur.

That is, in the electrical wire of 0.3 sq or 0.35 sq, the general terminal fixing load in an electrical wire connecting portion of a terminal having a pair of V-shaped or U-shaped barrels, or the like is 70 N or more, such that in a case where the electrical wire is substituted with the electrical wire of 0.13 sq with a small cross-sectional area of a conductor, and the electrical wire connecting portion is crimped to the electrical wire, it is difficult to obtain the same terminal fixing load of 70 N or more as with the electrical wire of 0.3 sq or 0.35 sq. More specifically, in a case where the terminal fixing load is set to 70 N or more, a crimping height C/H when a crimping width C/W of the electrical wire connecting portion is made to be constant has to be within a predetermined range. However, when the conductor part is made of annealed copper or pure copper, the range of the crimping height for setting the terminal fixing load of the electrical wire of 0.13 sq to 70 N or more is not broad. As a result thereof, accuracy is required when the terminal is crimped, and thereby it is difficult to use the electrical wire of 0.13 sq instead of the electrical wire of 0.3 sq or 0.35 sq.

In addition, using hard copper or a hard copper alloy as the conductor part of the fine wire of 0.13 sq, for example, may be considered from the viewpoint of tensile strength or the like, but even when hard copper or a hard copper alloy is used as the conductor part, the range of the crimping height is not broad.

In addition, in the above description, the electrical wire for a vehicle is described as an example, but the problem is not limited to the electrical wire for a vehicle, and may be applied to other electrical wires of 0.13 sq where adjustment of the crimping height is difficult.

The invention has been made to solve the above-described problem in the related art, and an object of the invention is to provide an electrical wire and an electrical wire with a terminal capable of diminishing the adjustment of a crimping height.

Solution to Problem

According to an aspect of the invention, there is provided an electrical wire including a conductor part that is made of a precipitation strengthened copper alloy having a cross-sectional area of 0.13 sq in the ISO 6722 standard and is compressed, wherein the conductor part has a rate of elongation of 7% or more, and a tensile strength of 500 MPa or more.

According to this electrical wire, the conductor part that is made of the precipitation strengthened copper alloy is included, the conductor part has a rate of elongation of 7% or more, and a tensile strength of 500 MPa or more. Therefore, tensile strength of the conductor part is improved to some extent by work strain (work hardening), and a state where the terminal is fixed to the conductor part is easily maintained. Accordingly, it is possible to broaden the region where the terminal fixing load is 70 N or more, and even when variations in crimping are present, it is easy to realize an electrical wire of 0.13 sq that satisfies the required terminal fixing load. Therefore, it is possible to diminish the adjustment of the crimping height. The precipitation strengthened copper alloy may be specifically made of a copper alloy such as Cu—Cr—Zr series, Cu—Co—P series, Cu—Cr—Sn series, and Cu—Fe—P series. Preferable blending ratio of the copper alloy is disclosed in Description of Embodiments.

In addition, according to another aspect of the invention, there is provided an electrical wire including a conductor part that is made of a precipitation strengthened copper alloy having a cross-sectional area of 0.13 sq in the ISO 6722 standard, wherein the conductor part has a rate of elongation of 7% or more, and a tensile strength of 500 MPa or more, and the electrical conductivity of the conductor part is 70% IACS or more.

According to this electrical wire, the electrical conductivity of the conductor part is 70% IACS or more. Here, the electrical conductivity of the conductor has an effect on the tensile strength and the tensile strength is preferably 500 MPa or more, and in a case where the conductor has a tensile strength such that the electrical conductivity is 70% or more, it is possible to use an electrical wire of 0.13 sq in combination with a 5 A fuse and it is possible to use an electrical wire as a power source line having a current value that is not as large as this value.

In addition, in the electrical wire of the invention, it is preferable that in precipitation strengthened copper alloy, the rate of decrease in strength be 18% or less with respect to a rate of decrease of 30% in the cross-sectional area.

According to this electrical wire, in precipitation strengthened copper alloy, the rate of decrease in the strength is 18% or less with respect to a rate of decrease of 30% in the cross-sectional area, such that it is possible to provide an electrical wire with a terminal in which the decrease in the strength is small, and that is advantageous in the case of processing the electrical wire with a terminal.

In addition, according to another aspect of the invention, there is provided an electrical wire with a terminal. The electrical wire includes the above-described electrical wire and a terminal that includes a pair of barrels and that compresses the conductor part of the electrical wire and is crimped thereto when the pair of barrels is bent in a direction where the barrels come close to each other.

According to this electric wire with the terminal, the electrical wire includes the above-described electrical wire and the terminal that includes a pair of barrels and that compresses the conductor part of the electrical wire and is crimped thereto when the pair of barrels is bent in a direction where the barrels come close to each other. Here, generally, in manufacturing a fine wire of 0.13 sq or the like, there is a tendency to use a material such as hard copper and a hard copper alloy whose tensile strength is made to be 700 MPa or more in advance as the conductor part. This tensile strength is necessary because the rate of decrease in strength is high in a portion where the conductor cross-sectional area is diminished due to the crimping of the terminal, in consideration of a work hardening characteristic of the hard copper or hard copper alloy, and as a result thereof, elongation is sacrificed. However, in the above-described electrical wire, it is not necessary to increase the tensile strength to an extent of 700 MPa, and the conductor part has work hardening characteristics due to the work strain to some extent, such that it is possible to allow the rate of decrease in strength occurred due to the crimping of the terminal to be small. Accordingly, it is possible to suppress the decrease in the strength in the crimping portion accompanying the decrease in the cross-sectional area.

In addition, in the electrical wire with the terminal, it is preferable that the crimping height that represents the height of the terminal in the crimping portion thereof be equal to or greater than 0.67 mm and equal to or less than 0.87 mm, and the terminal fixing load at the crimping portion be 70 N or more when measured according to the measuring method defined in JASO D 616.

According to this electrical wire with the terminal, the crimping height is equal to or greater than 0.67 mm and equal to or less than 0.87 mm, and a terminal fixing load at the crimping portion is 70 N or more when measured according to a measuring method defined in JASO D 616, such that it is possible to provide an electrical wire with a terminal which has the same 70 N terminal fixing load as the electrical wire of 0.3 sq or 0.35 sq.

Advantageous Effect of the Invention

According to the invention, it is possible to provide an electrical wire and an electrical wire with a terminal capable of diminishing the adjustment of a crimping height.

DESCRIPTION OF EMBODIMENTS

Figure 1:
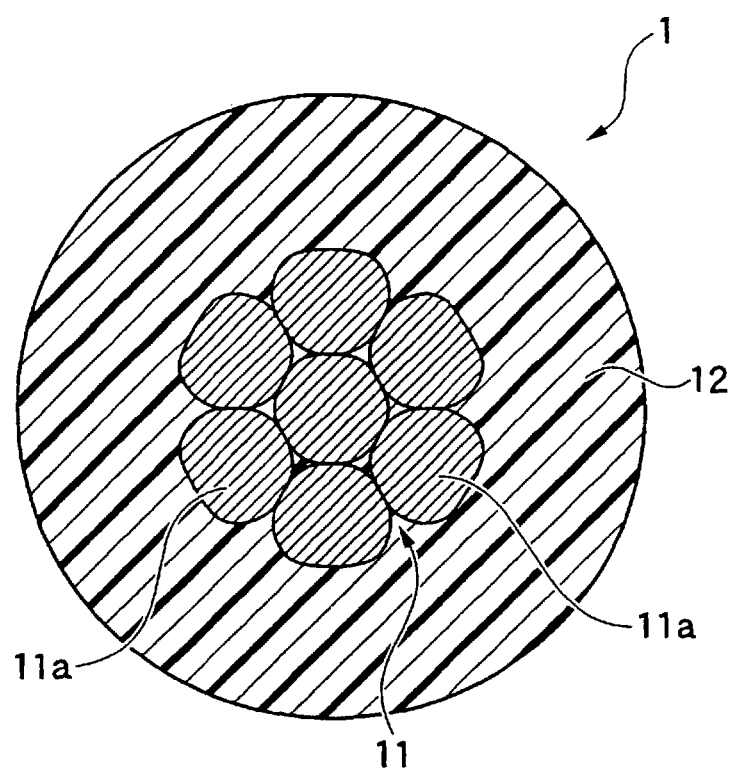
FIG. 1 is a schematic diagram illustrating an example of an electrical wire according to an embodiment of the invention.

Hereinafter, a preferred embodiment of the invention will be described with reference to the accompanying drawings. FIG. 1 is a schematic diagram illustrating an example of an electrical wire according to an embodiment of the invention.

As shown in FIG. 1, an electrical wire 1 according to the present embodiment is configured by coating a conductor part 11 with an insulating part 12. The conductor part 11 is formed by twisting and compressing each of strands 11a. In the present embodiment, the conductor part 11 is made of a precipitation strengthened copper alloy, and specifically, made of a copper alloy such as Cu—Cr—Zr series, Cu—Co—P series, Cu—Cr—Sn series, and Cu—Fe—P series.

In regard to the conductor part 11, the blending ratio of each metal is as follows. Specifically, in a case where the conductor part 11 is made of Cu—Cr—Zr series copper alloy, the content of Cr is 0.50 to 1.50% by mass, the content of Zr is 0.05 to 0.15% by mass, the content of Sn is 0.10 to 0.20% by mass, and the remainder is Cu. In addition, where the conductor part 11 is made of Cu—Co—P series copper alloy, the content of Co is 0.20 to 0.30% by mass, the content of P is 0.07 to 0.12% by mass, the content of Ni is 0.02 to 0.05% by mass, the content of Sn is 0.08 to 0.12% by mass, the content of Zn is 0.01 to 0.04% by mass, and the remainder is Cu.

Figure 2:
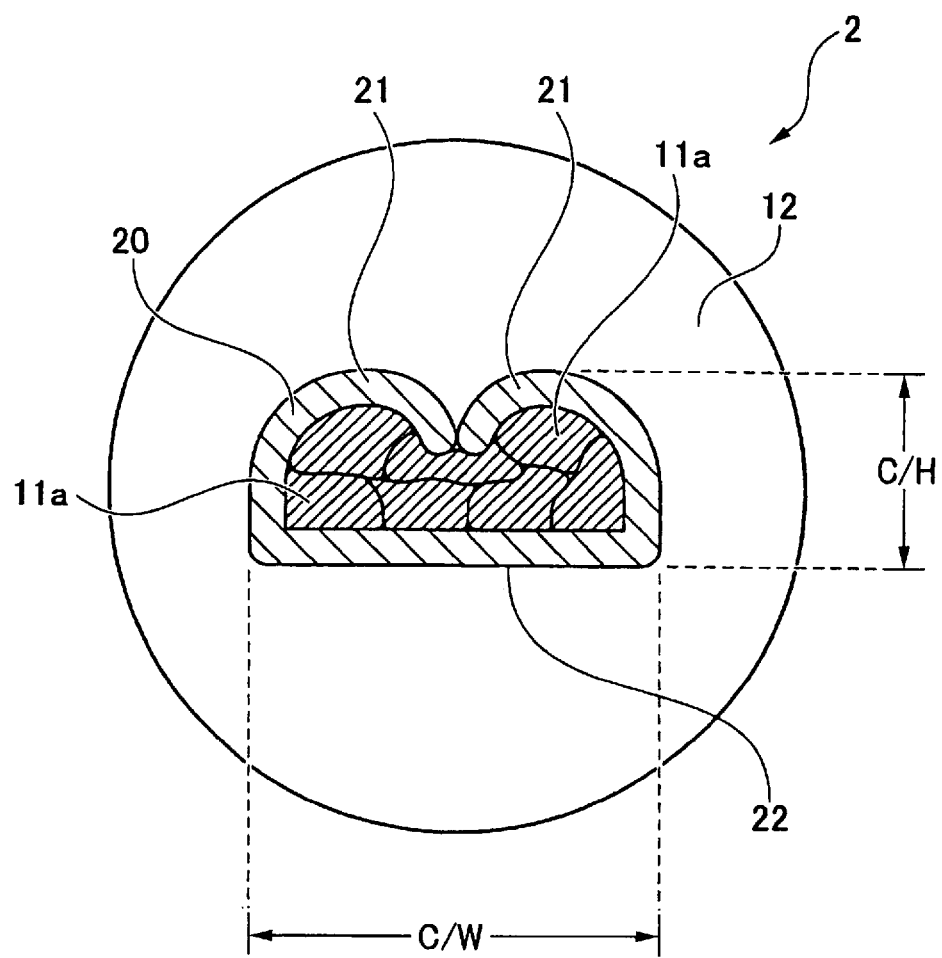
FIG. 2 is a cross-sectional diagram of an electrical wire with a terminal according to an embodiment of the invention.

Here, an electrical wire with a terminal in which the terminal is crimped to the electrical wire 1 according to the present embodiment will be described. FIG. 2 shows a cross-sectional diagram illustrating an electrical wire 2 with the terminal according to the embodiment of the invention. As shown in FIG. 2, a terminal 20 includes a pair of barrels 21 that compresses the conductor part 11, and is crimped thereto. The pair of barrels 21 is erected from both ends of the bottom surface portion 22 of the terminal 20, and has a V-shaped or U-shaped cross section before being crimped to the conductor part 11. In addition, when being crimped, the pair of barrels 21 is bent in a direction where the distal end sides of the V-shaped or U-shaped portion come into contact to each other. In this manner, the terminal 20 is crimped to the conductor part 11.

In addition, generally, the height of the terminal 20 in the crimping portion is called the crimping height C/H, and the width of the terminal 20 is called the crimping width C/W.

In addition, in the present embodiment, the rate of elongation of the conductor part 11 in the present embodiment is 7% or more, and the tensile strength is 500 MPa or more. When the rate of elongation is less than 7%, in a case where measurement by a tensile testing machine defined in JIS-Z-2241 is performed, it is difficult to obtain a terminal fixing load of 70 N, since sufficient work hardening is not obtained at the time of crimping the terminal and the strength in the conductor part 11 becomes small. Similarly, when the tensile strength is less than 500 MPa, in a case where measurement by a tensile testing machine defined in JIS-Z-2241 is performed, it is difficult to obtain a terminal fixing load of 70 N at a broad range of crimping height. In addition, the tensile strength is obtained from a testing power (N) measured by a tensile testing machine defined in JIS-Z-2241, and the rate of elongation is obtained from the length between index points measured by using an elongation measuring device.

In addition, it is preferable that the rate of elongation be less than 20%. The reason for this restriction is as follows. The rate of elongation is correlated with the tensile strength, and when the rate of elongation varies, the tensile strength also tends to vary. From this tendency, in the case of an alloy including copper as a base substance, when the rate of elongation is 20% or more, the tensile strength of 500 MPa can no longer be maintained. In addition, it is preferable that the tensile strength be less than 750 MPa. The reason for this restriction is as follows. In the case of an alloy including copper as a base substance, when the tensile strength is 750 MPa or more, the rate of elongation of 7% cannot be maintained any more.

To manufacture the conductor part 11 having such a rate of elongation and tensile strength, the above-described precipitation strengthened copper alloy must be used, and in the case of using annealed copper or pure copper, the above-described conductor part 11 cannot be manufactured.

Figure 3:
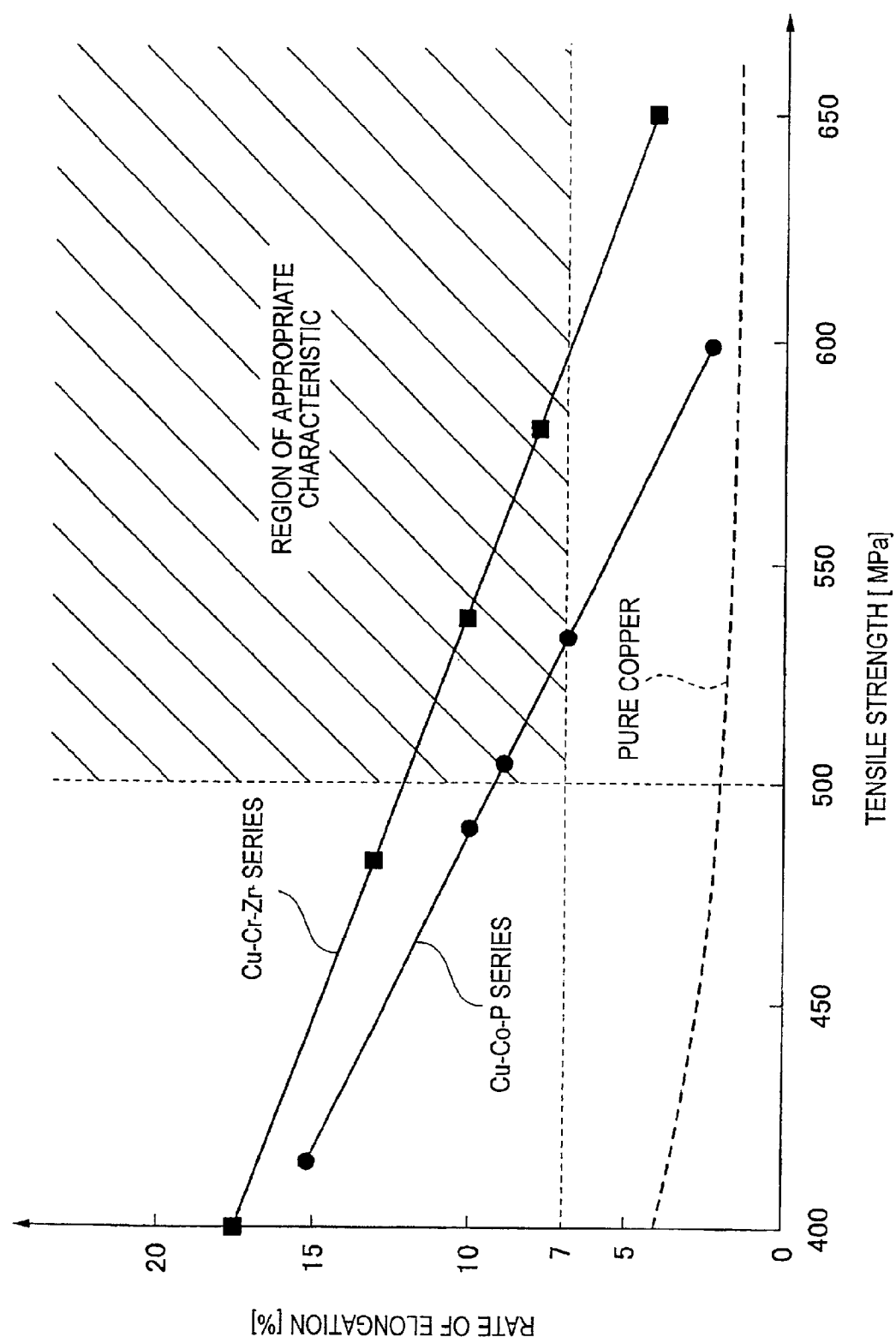
FIG. 3 is a graph illustrating a correlation between a rate of elongation and tensile strength.

FIG. 3 shows a graph illustrating a correlation between the rate of elongation and the tensile strength. As shown in FIG. 3, when pure copper or a dilute copper alloy is thermally refined in a manner such that the tensile strength is 500 MPa, the rate of elongation becomes 2 to 3%. In addition, although not shown in FIG. 3, when the rate of elongation is 7% or more, the tensile strength becomes less than 400 MPa to a large extent. Therefore, in the electrical wire of 0.13 sq according to the present embodiment, the precipitation strengthened copper alloy is used for the conductor part 11.

For example, as shown in FIG. 3, in the case of Cu—Co—P series copper alloy, when the rate of elongation is set to 7%, it is possible to obtain a tensile strength of approximately 530 MPa, and when the tensile strength is set to 500 MPa, it is possible to obtain the rate of elongation of approximately 9%. In addition, in the case of Cu—Cr—Zr series copper alloy, when the rate of elongation is set to 7%, it is possible to obtain a tensile strength of approximately 587 MPa, and when the tensile strength is set to 500 MPa, it is possible to obtain the rate of elongation of approximately 13%.

In addition, in regard to the above-described precipitation strengthened copper alloy, other than the above-described possibilities, when the blending amount is changed or a composition itself is changed and thereby the rate of elongation is equal to or greater than 7% and equal to or less than 20%, it is possible to realize the conductor part 11 having a tensile strength equal to or greater than 500 MPa and equal to or less than 750 MPa. In addition, according to the electrical wire of 0.13 sq that includes the conductor part 11, it is possible to broaden the crimping height range (see FIG. 5) for realizing a terminal fixing load of 70 N or more, and it is possible to diminish the adjustment of the range of the crimping height.

Next, a method of manufacturing the electrical wire 1 of 0.13 sq that includes the conductor unit 11 will be described. In manufacturing the electrical wire 1 according to the present embodiment, casting, solution treatment, intermediate drawing, finish drawing, twisting and compressing, refining heat treatment also serving as aging treatment, or the like is performed.

Figure 4:
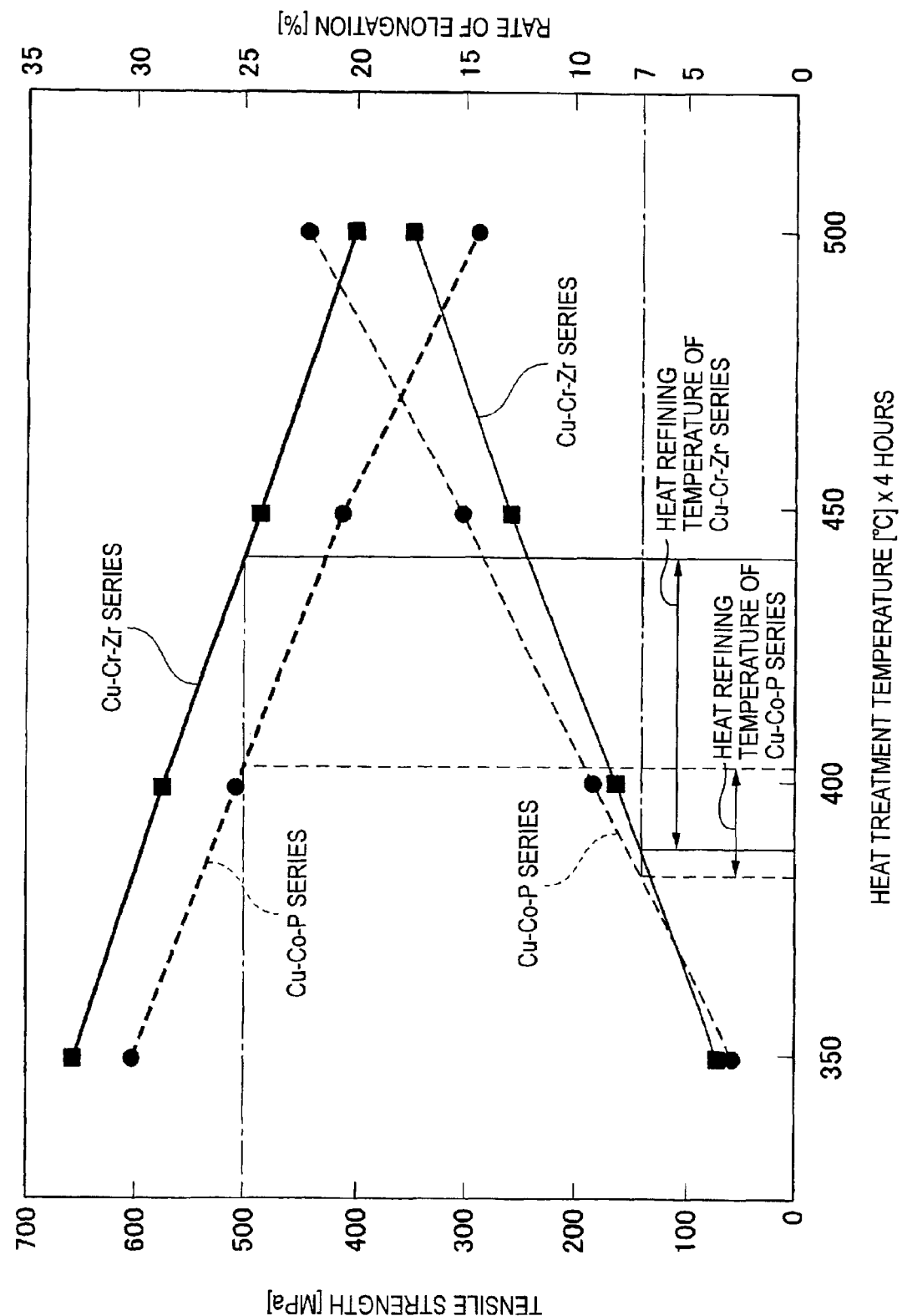
FIG. 4 is a graph illustrating a characteristic of an electric wire of 0.13 sq including a conductor part according to the embodiment.

FIG. 4 is a graph illustrating characteristics of the electrical wire 1 of 0.13 sq that includes the conductor part 11 according to the present embodiment. After performing the casting, the solution treatment, the intermediate drawing, the finish drawing, the twisting and compressing, or the like, the refining heat treatment is performed at temperatures and for a time shown in FIG. 4. Specifically, in the case of the Cu—Cr—Zr series copper alloy, the refining heat treatment is performed at temperatures of 390 to 440° C. for 4 hours, and thereby it is possible to obtain the conductor part 11 having a rate of elongation of 7% or more and the tensile strength of 500 MPa or more. In addition, in the case of the Cu—CO—P series copper alloy, the refining heat treatment is performed at temperatures of 385 to 405° C. for 4 hours, and thereby it is possible to obtain the conductor part 11 having the rate of elongation of 7% or more and the tensile strength of 500 MPa or more.

In addition, it is preferable that the electrical conductivity of the conductor part 11 be 70% IACS or more. In the present embodiment, when the rate of elongation of the conductor part 11 is 7% or more, and the tensile strength is 500 MPa or more, it is possible to diminish the adjustment of the crimping height. However, when the electrical wire 1 is manufactured ignoring electrical conductivity of the conductor part 11, there is a case where the electrical conductivity decreases, and in this case, the electrical wire 1 may not be used as a signal line for transmitting a switch signal or the like.

Here, it is known that tensile strength and electrical conductivity have a correlation. Therefore, when the conductor part 11 is manufactured only by focusing on the rate of elongation and the tensile strength, it may only provide the conductor part 11 having a low electrical conductivity and thereby the electrical wire 1 of 0.13 sq may be used for only the signal line. However, when the heat refinement for the tensile strength is performed in a manner such that not only the tensile strength is 500 MPa or more, but also the electrical conductivity is 70% IACS or more, it is possible to manufacture the conductor part 11 to be used as not only a signal line but also as a power source line of an electrical wire of 0.13 sq for allowing a low-current to be flowed.

Next, an example of the electrical wire 1 of 0.13 sq according to the present embodiment will be described.

First, as an example, the electrical wire 1 was obtained by using as the conductor part 11 the Cu—Cr—Zr series copper alloy subjected to the refining heat treatment at a temperature of 420° C. for 4 hours after the casting, the solution treatment, the intermediate drawing, the finish drawing, and the twisting and compressing. At this time, in the blending ratio, Cr was 0.79% by mass, Zr was 0.11% by mass, Sn was 0.10% by mass, and the remainder was Cu. The rate of elongation at this time was 10% and the tensile strength was 548 MPa.

In addition, as a comparative example 1, there was obtained an electrical wire using a conductor part of Cu—Sn series hard copper alloy to which a degree of processing with a work strain of 7 or more was applied by performing the casting and rolling, the intermediate drawing, the finish drawing, and the twisting and compressing without performing a heat treatment after the casting. At this time, in the blending ratio, Sn was 0.33% by mass, and the remainder was Cu. In addition, the work strain was 7.7. The rate of elongation at this time was 1.8% and the tensile strength was 828 MPa.

In addition, as a comparative example 2, the electrical wire was obtained by using as the conductor part an annealed copper alloy subjected to an annealing at a temperature of 250° C. for 1 hour after the casting and rolling, the solution treatment, the intermediate drawing, and the twisting and compressing. At this time, in the blending ratio, O was 135 ppm and the remainder was Cu. The rate of elongation at this time was 21% and the tensile strength was 219 MPa.

Figure 5:
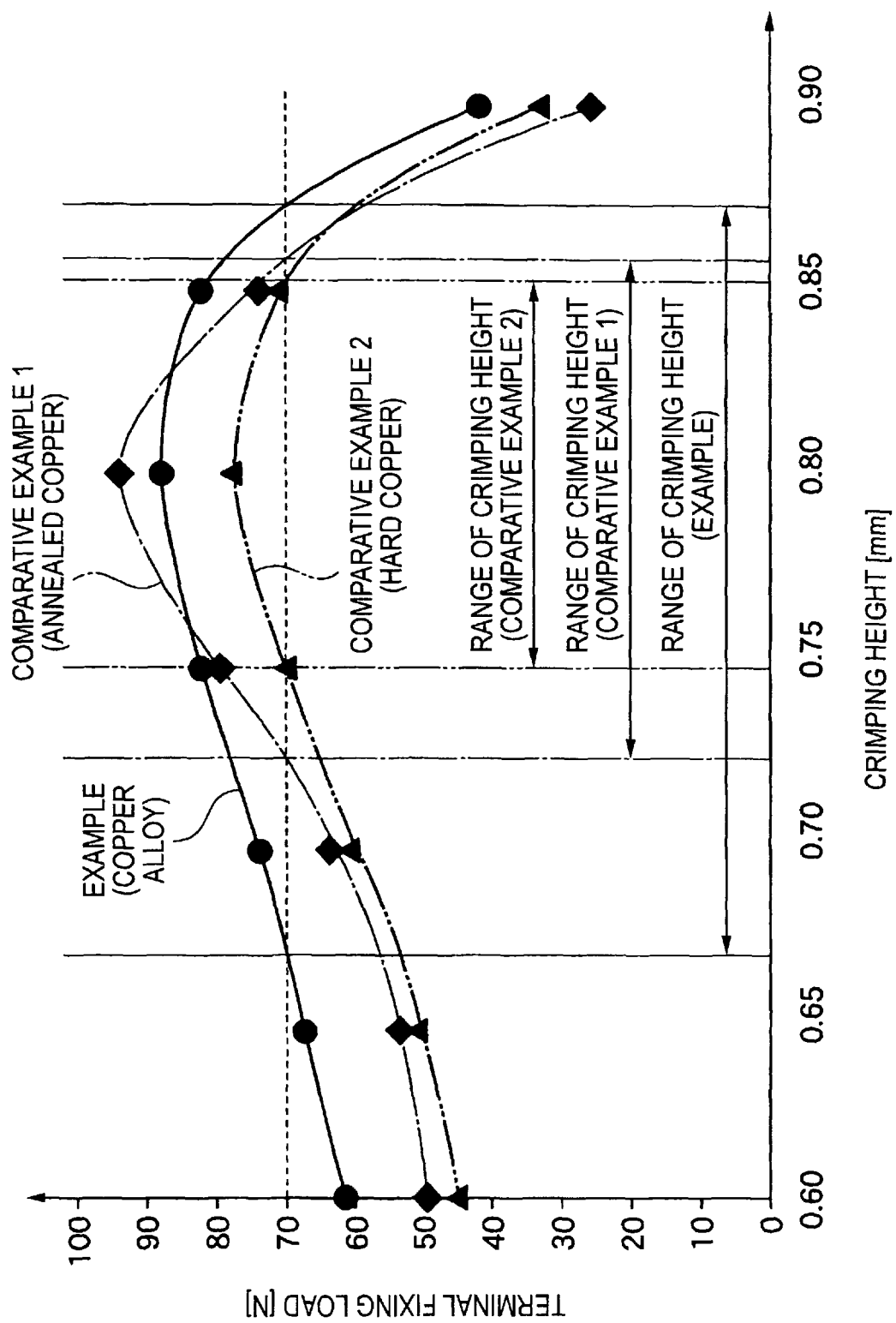
FIG. 5 is a graph illustrating a correlation between a crimping height and a terminal fixing load in regard to electrical wires of an example and comparative examples 1 and 2.

FIG. 5 shows a graph illustrating a correlation between a crimping height and a terminal fixing load in regard to each of the electrical wires in the example and the comparative examples 1 and 2. In addition, the terminal fixing rate shown in FIG. 5 was measured by a measuring method defined in JASO D 616.

As shown in FIG. 5, in a case where the conductor part of the electrical wire of 0.13 sq in the example was exposed, and the terminal was crimped, a result was obtained in which the terminal fixing load of 70 N or more was exhibited in a crimping height range of 0.67 to 0.87 mm.

In addition, in a case where the conductor part of the electrical wire of 0.13 sq in the comparative example 1 was exposed, and the terminal was crimped, a result was obtained in which the terminal fixing load of 70 N or more was exhibited in a crimping height range of 0.73 to 0.86 mm. In addition, in a case where the conductor part of the electrical wire of 0.13 sq in the comparative example 2 was exposed, and the terminal was crimped, a result was obtained in which the terminal fixing load of 70 N or more was exhibited in a crimping height range of 0.75 to 0.85 mm.

As described above, in the electrical wire 1 of 0.13 sq representing the present embodiment, it is possible to make the rate of elongation equal to or greater than 7% and equal to or less than 20%, to make the tensile strength equal to or greater than 500 MPa and less than 750 MPa, and to broaden the crimping height range for realizing a terminal fixing load of 70 N or more, compared to the case where the conductor part 11 was hard copper or annealed copper. Therefore, defective products below the standard do not easily occur and it is not necessary to frequently examine the crimping height.

In this manner, according to the electrical wire 1 of 0.13 sq according to the present embodiment, the conductor part 11 made of the precipitation strengthened copper alloy is included, the rate of elongation of the conductor part 11 is 7% or more, and the tensile strength is 500 MPa or more. Therefore, in a case where the tensile evaluation on the electrical wire 1 is performed, the tensile strength of the conductor part 11 is improved to some extent by work strain (work hardening), and a state where the terminal 20 is fixed to the conductor part 11 is easily maintained. Accordingly, it is possible to broaden a region where the terminal fixing load is 70 N or more, and even when variation in crimping are present, it is easy to realize an electrical wire of 0.13 sq that satisfies the required terminal fixing load. Therefore, it is possible to diminish the adjustment of the crimping height.

In addition, the electrical conductivity of the conductor part 11 is 70% IACS or more. Here, the electrical conductivity of the conductor has an effect on the tensile strength and the tensile strength is preferably 500 MPa or more, and in a case where the conductor has a tensile strength such that the electrical conductivity is 70% IACS or more, it is possible to use the electrical wire of 0.13 sq in combination with a 5 A fuse and it is possible to use the electrical wire as a power source line having a current value that is not as large as this value.

In addition, use of a Corson alloy or a beryllium alloy as the conductor part 11 may be considered to broaden the range of the crimping height, but in this case, it is difficult to use the conductor part 11 in combination with a 5 A fuse because of the electrical resistance of the conductor part 11. On the contrary, according to the copper alloy of the present embodiment, this difficulty does not occur, and thereby there is an advantage over the related art.

In addition, according to the electrical wire with the terminal of the present embodiment, the crimping height is equal to or greater than 0.67 mm and equal to or less than 0.87 mm, and the terminal fixing load is 70 N or more when measured according to a measuring method defined in JASO D 616, such that it is possible to provide an electrical wire with a terminal which has the same 70 N terminal fixing load as the electrical wire of 0.3 sq or 0.35 sq.

Hereinbefore, the invention is described based on the embodiment, but the invention is not limited to the above-described embodiment and various changes may be made without departing from the scope of the invention. For example, the method of manufacturing the electrical wire 1 of 0.13 sq according to the embodiment is not limited to the above description, and may be changed depending on the kind of the precipitation strengthened copper alloy.

In addition, in regard to the electrical wire 2 with the terminal in which the terminal 20 is crimped to the conductor part 11 of the electrical wire 1 of 0.13 sq according to the embodiment, there are advantages as follows.

Figure 6:
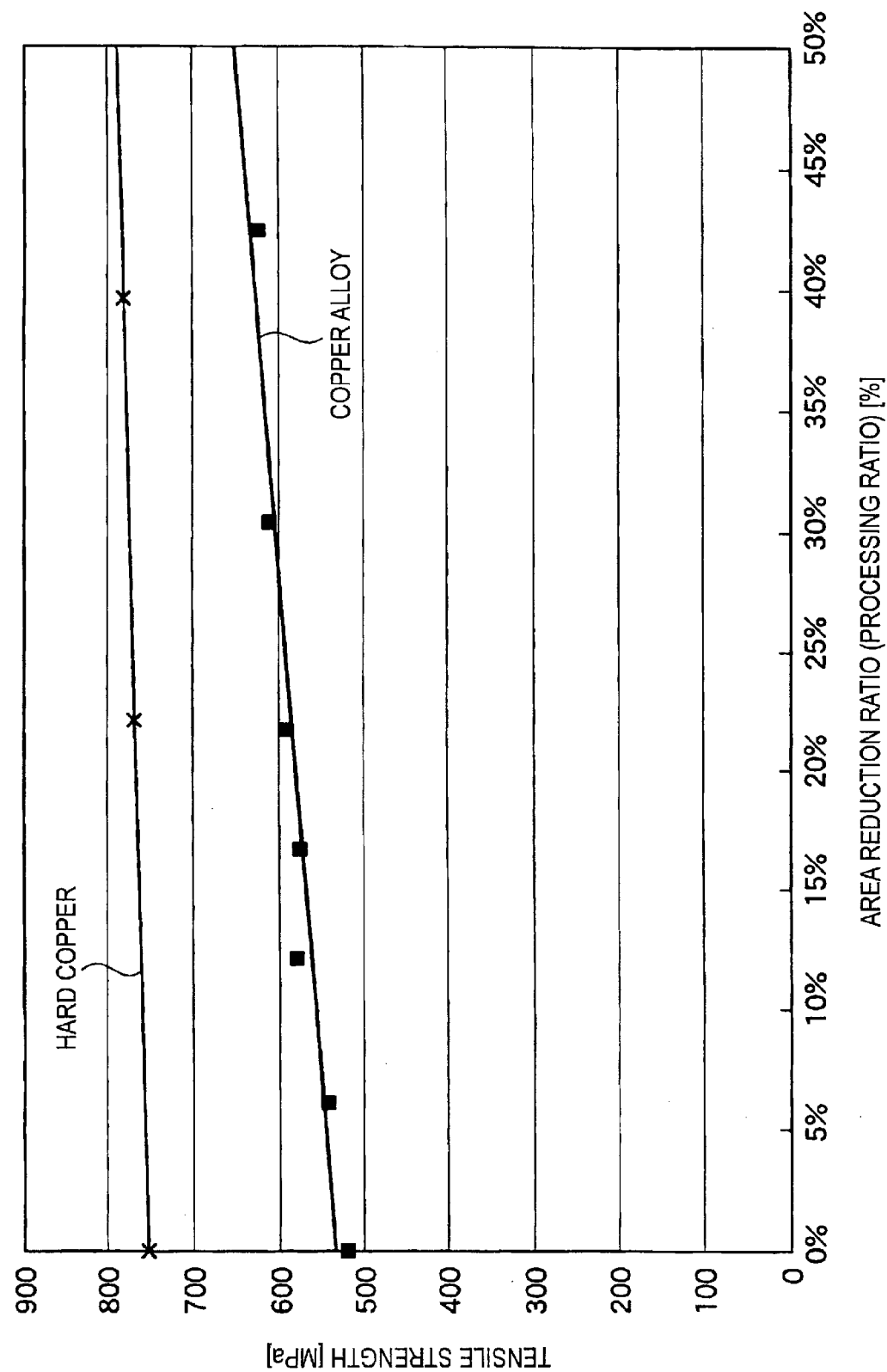
FIG. 6 is a graph illustrating work hardening characteristics of each metal.

From FIG. 5, it can be seen that even in the hard copper, the range of the crimping height to make the terminal fixing load 70 N or more is to some extent broad. However, the copper alloy as indicated by the present embodiment is advantageous in the aspect of strength for crimping the terminal 20 as shown in FIG. 6. FIG. 6 shows a graph illustrating a work hardening characteristic of each metal. For example, in a state where the terminal 20 is not crimped and the conductor part 11 is not compressed (the reduction ratio in the cross-sectional area is 0%), the copper alloy illustrated in the present embodiment has 540 MPa, and the hard copper has 750 MPa.

When the terminal 20 is crimped, the conductor part 11 is compressed and the cross-sectional area of the conductor part 11 becomes 70% with respect to the cross-sectional area before compressing (the reduction ratio in the cross-sectional area is 30%). At this time, the copper alloy illustrated in the present embodiment is advantageous over the hard copper from the aspect of the strength after crimping on the basis of the following grounds.

Here, the conductor part 11 (metal) has a characteristic of being hardened when it is compressed by the crimping. The hardening itself increases the strength in the crimping portion. On the other hand, the cross-sectional area of the conductor 11 decreases by the crimping. The reduction itself in the cross-sectional area decreases the strength in the crimping portion. Therefore, the strength after the crimping is calculated from the hardened ratio and reduction ratio in the cross-sectional area due to the crimping.

In the case of the copper alloy representing the present embodiment, the strength before the compression can be expressed by 521 [MPa]×S[mm$^2$] (S is the cross-sectional area)=521 S[N]. On the other hand, in the case of the reduction ratio in the cross-sectional area being 30%, the strength after the compression is 613 [MPa]×0.7 S[mm$^2$]≈423 S[N]. That is, the strength is reduced by 521 S[N]−429 S[N]=92 S[N]. When this is expressed with a reduction ratio from the strength before the compression, it is decreased by 92 S[N]÷521 S[N]=18%.

On the other hand, in the case of the hard copper, the strength before the compression is 750 [MPa]×S[mm$^2$]=750 S[N], and the strength after the compression is 775 [MPa]×0.7 S[mm$^2$]≈543 S[N]. That is, the strength is reduced by 750 S[N]−543 S[N]=207 S[N]. When this is expressed with a reduction ratio from the strength before the compression, it is decreased by 207 S[N]÷750 S[N]=28%.

When comparing the two examples described above with each other, the reduction of the strength in the copper alloy illustrating the present embodiment is smaller than that in the hard alloy. That is, even in a stage where the electric wire 2 with the terminal is processed, the electrical wire 1 according to the present embodiment is advantageous. In addition, it is preferable that the reduction ratio in the strength be small, and more preferably, the reduction ratio be 18% or less as described above.

INDUSTRIAL APPLICABILITY

According to the invention, it is possible to provide an electrical wire and an electrical wire with a terminal capable of diminishing the adjustment of a crimping height.

The present application is based on Japanese Patent Application No. 2010-163614, the entire contents of which are incorporated herein by reference.

The invention claimed is:
1. An electrical wire, comprising:
a conductor part that is made of a precipitation strengthened copper alloy having a cross-sectional area of 0.13 sq in ISO 6722 standard and is compressed,
wherein the conductor part has a rate of elongation of 7% or more, and a tensile strength of 500 MPa or more wherein in the precipitation strengthened copper alloy, a rate of decrease in strength is 18% or less with respect to a rate of decrease of 30% in a cross-sectional area.

2. The electrical wire according to claim 1, wherein the precipitation strengthened copper alloy is made of a copper alloy selected from Cu—Cr—Zr series, Cu—Co—P series, Cu—Cr—Sn series, and Cu—Fe—P series.

3. The electrical wire according to claim 1, wherein the conductor part is made of Cu—Cr—Zr series copper alloy, the content of Cr is 0.50 to 1.50% by mass, the content of Zr is 0.05 to 0.15% by mass, the content of Sn is 0.10 to 0.20% by mass, and the remainder is Cu.

4. The electrical wire according to claim 1,
wherein the conductor part is made of Cu—Co—P series copper alloy, the content of Co is 0.20 to 0.30% by mass, the content of P is 0.07 to 0.12% by mass, the content of Ni is 0.02 to 0.05% by mass, the content of Sn is 0.08 to 0.12% by mass, the content of Zn is 0.01 to 0.04% by mass, and the remainder is Cu.

5. An electrical wire with a terminal, comprising:
the electrical wire according to claim 1; and
a terminal that includes a pair of barrels and that compresses the conductor part of the electrical wire and is crimped thereto forming a crimping portion when the pair of barrels is bent in a direction where the barrels come close to each other.

6. The electrical wire with the terminal according to claim 5,
wherein a crimping height that represents a height of the terminal in the crimping portion thereof is equal to or greater than 0.67 mm and equal to or less than 0.87 mm, and
a terminal fixing load at the crimping portion is 70 N or more when measured according to a measuring method defined in JASO D 616.

\* \* \* \* \*